(12) United States Patent
Liu et al.

(10) Patent No.: US 11,964,305 B2
(45) Date of Patent: Apr. 23, 2024

(54) AUTOMATIC TRANSPORT DEVICE FOR CLEANING MACHINE

(71) Applicants: LAOKEN MEDICAL TECHNOLOGY CO., LTD., Chengdu (CN); SOUTHWEST JIAOTONG UNIVERSITY, Chengdu (CN)

(72) Inventors: Xia Liu, Chengdu (CN); Jiangxiong Luo, Chengdu (CN); Xianghui Chang, Chengdu (CN); Qijun Liu, Chengdu (CN); Junchuan Zhang, Chengdu (CN); Cong Zhang, Chengdu (CN); Miao Zhang, Chengdu (CN); Jun Liu, Chengdu (CN); Yong Liu, Chengdu (CN); Fuping Zhou, Chengdu (CN)

(73) Assignees: LAOKEN MEDICAL TECHNOLOGY CO., LTD., Chengdu (CN); SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/504,885

(22) Filed: Nov. 8, 2023

(65) Prior Publication Data
US 2024/0066571 A1 Feb. 29, 2024

Related U.S. Application Data

(63) Continuation of application No. PCT/CN2022/091119, filed on May 6, 2022.

(30) Foreign Application Priority Data
Dec. 29, 2021 (CN) .......................... 202111638834.1

(51) Int. Cl.
*B08B 13/00* (2006.01)

(52) U.S. Cl.
CPC .................................. *B08B 13/00* (2013.01)

(58) Field of Classification Search
CPC ....................................................... B08B 13/00
See application file for complete search history.

(56) References Cited

U.S. PATENT DOCUMENTS

| 5,476,111 A | * | 12/1995 | Andersen | ......... B29D 11/00221 134/59 |
| 2015/0060933 A1 | * | 3/2015 | Ohno | ...................... B65H 3/48 29/721 |

FOREIGN PATENT DOCUMENTS

| CN | 201070632 Y | * | 6/2008 |
| CN | 201070632 Y | | 6/2008 |

(Continued)

*Primary Examiner* — Marc Carlson (57) ABSTRACT

An automatic transport device for cleaning machines includes a transport base. A lifting-lowering assembly and a tray are provided on the transport base. The tray is connected to the transport base through the lifting-lowering assembly, and can be driven by the lifting-lowering assembly to reciprocate in a height direction. A top surface of the tray is provided with a translation assembly for transferring the shelf to the transport platform. A first mounting cavity is provided at each of front and rear ends of the tray. The translation assembly is connected to a side wall of the first mounting cavity. A second mounting cavity is provided at each of right and left ends of the tray. The second mounting cavity is provided with a limiting assembly, a lifting-lowering sensing assembly and a distance sensing assembly. An interactive system is provided in the transport base.

9 Claims, 10 Drawing Sheets

(56) References Cited

FOREIGN PATENT DOCUMENTS

| CN | 106241261 | A |   | 12/2016 |             |
|----|-----------|---|---|---------|-------------|
| CN | 106241261 | A | * | 12/2016 | ........... B65G 37/02 |
| CN | 108176630 | A | * | 6/2018  |             |
| CN | 109552863 | A | * | 4/2019  | ............. A61L 2/26 |
| CN | 109552863 | A |   | 4/2019  |             |
| CN | 209989009 | U | * | 1/2020  |             |
| CN | 209989009 | U |   | 1/2020  |             |
| CN | 210709110 | U | * | 6/2020  |             |
| CN | 210709110 | U |   | 6/2020  |             |
| CN | 212076306 | U | * | 12/2020 |             |
| CN | 212076306 | U |   | 12/2020 |             |
| CN | 212110596 | U |   | 12/2020 |             |
| CN | 212110596 | U | * | 12/2020 |             |
| CN | 213386598 | U | * | 6/2021  |             |
| CN | 213386598 | U |   | 6/2021  |             |
| CN | 214877601 | U | * | 11/2021 |             |
| CN | 214877601 | U |   | 11/2021 |             |
| CN | 114453374 | A | * | 5/2022  |             |

* cited by examiner

AUTOMATIC TRANSPORT DEVICE FOR CLEANING MACHINE

CROSS-REFERENCE TO RELATED APPLICATIONS

This application is a continuation of International Patent Application No. PCT/CN2022/091119, filed on May 6, 2022, which claims the benefit of priority from Chinese Patent Application No. 202111638834.1, filed on Dec. 29, 2021. The content of the aforementioned application, including any intervening amendments thereto, is incorporated herein by reference in its entirety.

TECHNICAL FIELD

This application relates to cleaning of medical devices, specifically to a transportation mechanism for a large-scale cleaning machine, and more particularly to an automatic transport device for a cleaning machine.

BACKGROUND

Automatic medical cleaning machine is mainly used for cleaning and pre-sterilization of medical devices, such as cleaning and sterilizing various surgical instruments and medical containers after surgery. Regarding the existing cleaning machines, the to-be-cleaned medical devices are loaded on a cleaning cart or cleaning frame, and then the cleaning cart is pushed into a cleaning compartment of the cleaning machine. After that, a door of the cleaning machine is closed, and a cleaning liquid prepared from an enzyme liquid and water is heated and sprayed at a certain pressure on the medical appliances on the cleaning cart. In such process, it is needed to manually place the cleaning cart or cleaning rack loaded with the medical appliances in the cleaning compartment, and manually take the cart or rack out of the cleaning compartment when the cleaning is completed. Considering that it is often required to simultaneously treat a large number of medical instruments, the manual handling will greatly reduce the cleaning efficiency of the cleaning machine, and increase labor costs. Moreover, the frequent ingress and egress will easily result in contamination in the cleaning room and will also cause secondary contamination of the cleaned medical instruments.

SUMMARY

In view of the deficiencies in the prior art, this application provides an automatic transport device for a cleaning machine, which is used for conveying shelves to a transport platform of the cleaning machine. The automatic transport device includes a transport base. A lifting-lowering assembly and a tray are provided on a top of the transport base. The tray is connected to the transport base through the lifting-lowering assembly. The lifting-lowering assembly can drive the tray to make a reciprocating movement in a vertical direction. Atop surface of the tray is provided with a translation assembly which is used to receive the racks and transfer shelves to the transport platform. One pair of opposite ends of the tray are provided with a first mounting cavity, respectively. The translation assembly is connected to a side wall of the first mounting cavity. The other pair of opposite ends of the tray are provided with a second mounting cavity. The two second mounting cavities are each provided with a limiting assembly, a lifting-lowering sensing assembly, and a distance sensing assembly. The lifting-lowering sensing assembly is used to position a height of the transport table. The distance sensing assembly can measure a distance between the transport device and the transport platform. The limiting assembly can limit the position of the shelf. An interactive system is installed in the transportation base. The lifting-lowering assembly, the translation assembly, the lifting-lowering sensing assembly, the limiting assembly, and the distance sensing assembly are all electrically connected to the interactive system. The automatic transport device enables the automatic transportation of medical devices, allowing for high cleaning efficiency and low labor intensity, and avoiding secondary contamination of the cleaned medical devices caused by human factors.

Technical solutions of this application are described as follows.

In a first aspect, this application provides an automatic transport device for conveying a shelf to a transport platform of a cleaning machine, comprising:
a transport base;
a lifting-lowering assembly;
a tray; and
a translation assembly;
wherein the lifting-lowering assembly and the tray are provided on a top of the transport base; the tray is connected to the transport base through the lifting-lowering assembly; and the lifting-lowering assembly is configured to drive the tray to reciprocate in a height direction of the tray;
a top surface of the tray is provided with the translation assembly; and the translation assembly is configured to receive and transfer the shelf to the transport platform;
a first end of the tray and a second end of the tray opposite to the first end of the tray are each provided with a first mounting cavity; and the translation assembly is connected to a side wall of the first mounting cavity;
a third end of the tray and a fourth end of the tray opposite to the third end of the tray are each provided with a second mounting cavity; the second mounting cavity is provided with a limiting assembly, a lifting-lowering sensing assembly, and a distance sensing assembly; the lifting-lowering sensing assembly is configured to position a height of the transport platform; the distance sensing assembly is configured to measure a distance between the transport device and the transport platform; and the limiting assembly is configured to limit a position of the shelf,
an interactive system is provided in the transport base; and the lifting-lowering assembly, the translation assembly, the lifting-lowering sensing assembly, the limiting assembly, and the distance sensing assembly are electrically connected to the interactive system;
the limiting assembly comprises a mounting plate; and a first fixing base, a second fixing base, a third fixing base, a stopper rod, a linkage rod, and an electromagnetic device are provided on the mounting plate;
the stopper rod passes sequentially through a top surface of the second mounting cavity, the first fixing base and the second fixing base; the stopper rod is provided with a first limiting ring; the first limiting ring is located between the first fixing base and the second fixing base; and the stopper rod is sleevedly provided with a first spring, and the first spring is located between the second fixing base and the first limiting ring;
a lower end of the stopper rod is connected to the electromagnetic device through the linkage rod; the linkage rod is provided with a fixing member; and the linkage rod is connected to the mounting plate through the fixing member;

the electromagnetic device is mounted on the third fixing base; a lower end of the electromagnetic device passes through the third fixing base; the lower end of the electromagnetic device is sleevedly provided with a second spring and a second limiting ring; and the third fixing base and the second limiting ring are configured to limit the second spring; and the lower end of the electromagnetic device is configured to reciprocate along a height direction of the electromagnetic device, so as to drive the stopper rod to reciprocate in a height direction of the stopper rod.

In an embodiment, a support assembly is provided at a lower end of the tray; the support assembly comprises a first support frame and a second support frame; the first support frame is connected to the lower end of the tray; the second support frame is connected to the transport base; the first support frame is located above the second support frame and abuts against the second support frame; and the first support frame is connected to the transport base through the lifting-lowering assembly.

In an embodiment, the first support frame comprises a first transverse beam, a plurality of guide-support assemblies and a second transverse beam; each of the plurality of guide-support assemblies comprises a guiding shaft; the guiding shaft is sleevedly provided with a third spring and a first limiting seat; a lower end of the guiding shaft is provided with a second limiting seat; the first limiting seat and the second limiting seat are configured to limit the third spring; the guiding shaft is connected to the first transverse beam through the first limiting seat; the guiding shaft is connected to the second transverse beam through the second limiting seat; and the first transverse beam is configured to reciprocate in a height direction of the guiding shaft.

In an embodiment, the lifting-lowering assembly comprises a driving device and a deceleration device; the driving device is mounted on the transport base; an output shaft of the driving device is connected to the deceleration device; and an output shaft of the deceleration device is connected to a lower end of the tray.

In an embodiment, the translation assembly comprises a plurality of first transfer rollers, a plurality of second transfer rollers, a first traction member, a plurality of second traction members, a transmission shaft, and a driving device;

an end of each of the plurality of first transfer rollers penetrates through and is connected with a side wall of one of two first mounting cavities; and an end of each of the plurality of second transfer rollers penetrates through and is connected with a side wall of the other of the two first mounting cavities;

the transmission shaft is mounted at a lower end of the tray; and an output shaft of the driving device is connected to the transmission shaft via the first traction member; and an end of the transmission shaft is connected to the plurality of first transfer rollers via the second traction member; and the other end of the transmission shaft is connected to the plurality of second transfer rollers via the second traction member.

In an embodiment, when the stopper rod is moved downwardly into place, a height of a top surface of the stopper rod is equal to or lower than a height of a top surface of the second mounting cavity.

In an embodiment, the lifting-lowering sensing assembly comprises a mounting base and a reflective plate; the mounting base is mounted on a side wall of the tray; the mounting base is provided with a photoelectric sensing device; and the reflective plate is mounted on the transport platform; and an avoidance hole is provided on a side wall of the second mounting cavity and is opposite to the photoelectric sensing device.

In an embodiment, the distance sensing assembly comprises a mounting base; a distance sensing device is mounted on the mounting base; an avoidance hole is provided on a side wall of the second mounting cavity; and the distance sensing device is configured to detect a distance between the transport platform and the distance sensing device through the avoidance hole.

In an embodiment, the first mounting cavity is further provided with a guiding assembly; the guiding assembly comprises a light slot; a light barrier is provided in the light slot; a light strip is provided on each of two sides of the light barrier; the light strip is connected to a surface of the light slot; a diffusion film and a diffusion plate are provided on a side wall of the light slot; and the diffusion film is located between the light strip and the diffusion plate.

Compared to the prior art, this application has the following beneficial effects.

The automatic transport device provided herein can receive commands from an external control device through an interactive system for transporting medical devices. After the shelf is placed on the tray, the limiting assembly is started. The upper end of the limiting assembly extends out of the top surface of the second mounting cavity and restricts the shelf between two limit assemblies. The automatic transport device moves to the vicinity of the transport platform according to a preset route and then stops. The lifting-lowering assembly raises or lowers the tray until the lifting-lowering sensing assembly detects a light signal reflected by a reflective plate on the transport platform, indicating that the surface of the tray is at the same level as the surface of the transport platform, and the lifting-lowering assembly stops working. The distance sensing assembly detects the distance between the transport device and the transport platform. The transport base continues to move until the transport device is in contact with the transport platform, and at this point, the limiting assembly is reset to no longer limit the shelf. The translation assembly transfers the shelf to the transport platform, thereby completing the delivery of the to-be-cleaned medical devices. The transportation of the cleaned medical devices is substantially the same as the process described above. The automatic transport device can replace the manual transportation of medical devices, improving the cleaning efficiency, reducing the labor costs, and avoiding secondary contamination of the cleaned medical devices caused by human factors.

In the figures: 100—transport platform; 110—transport base; 130—lifting-lowering assembly; 131—first driving device; 133—deceleration device; 150—tray; 170—translation assembly; 171—first transfer roller; 173—second transfer roller; 175—first traction member; 177—second traction member; 179—transmission shaft; 181—second driving device; 190—first mounting cavity; 210—limiting assembly; 211—mounting plate; 212—linkage rod; 213—first fixing base; 215—second fixing base; 217—third fixing base; 219—stopper rod; 222—fixing member; 223—electromagnetic device; 224—second limiting ring; 225—first limiting ring; 226—first spring; 229—second spring; 230—second mounting cavity; 250—lifting-lowering sensing assembly; 251—first mounting base; 253—reflective plate; 255—photoelectric sensing device; 270—distance sensing assembly; 271—second mounting base; 273—distance sensing device; 290—support assembly; 300—first support frame; 301—first transverse beam; 303—second transverse beam; 305—fixing plate; 307—first displacement detection device; 309—second displacement detection device; 310—guide-support assembly; 311—guiding shaft; 313—third spring; 315—first limiting seat; 317—second limiting seat; 319—second support frame; 330—guiding assembly; 331—light slot; 333—light barrier; 335—light strip; 337—diffusion film; and 339—diffusion plate.

DETAILED DESCRIPTION OF EMBODIMENTS

The technical solutions of the disclosure will be further described in detail below in conjunction with the accompanying drawings and embodiments, which are not intended to limit the disclosure.

As shown in FIGS. 1 to 9, an automatic transport device for transporting shelves to a transport platform 100 of a cleaning machine is provided, which includes a transport base 110, a lifting-lowering assembly 130, a tray 150, and a translation assembly 170.

The lifting-lowering assembly 130 and the tray 150 are mounted on a top of the transport base 110. The tray 150 is connected to the transport base 110 via the lifting-lowering assembly 130. The lifting-lowering assembly 130 can drive the tray 150 to move up and down, so as to adapt the height of the pallet 150 to that of the transport platform 100. The top surface of the tray 150 is provided with a translation assembly 170, on which the shelves are placed. The translation assembly 170 can receive and transfer the shelves to the transport platform 100 during operation.

A front end of the tray 150 and a rear end of the tray 150 opposite to the front end of the tray 150 are each provided with a first mounting cavity 190, and the translation assembly 170 is connected to a side wall of the first mounting cavity 190. A left end of the tray 150 and a right end of the tray 150 opposite to the left end of the tray 150 are each provided with a second mounting cavity 230, and the two second mounting cavities 230 are mounted with a limiting assembly 210, a lifting-lowering sensing assembly 250, and a distance sensing assembly 270.

The lifting-lowering sensing assembly 250 is used to position the height of the transport platform 100. When the lifting-lowering assembly 130 raises or lowers the tray 150, the lifting-lowering sensing assembly 250 can sense whether the tray 150 is at the same height as the transport platform 100. The distance sensing assembly 270 can measure the distance between the transport device and the transport platform 100, so as to realize accurate docking between the transport device and the transport platform 100. The limiting assembly 210 can limit the shelves and restrict the shelves in the tray 150. The transport base 110 is installed with an interactive system. The interactive system can interact with the external control device. The lifting-lowering assembly 130, the translation assembly 170, the lifting-lowering sensing assembly 250, the limiting assembly 210, and the distance sensing assembly 270 are all electrically connected to the interactive system. The staff can manipulate the transport device through the external control system.

In addition, there is a proximity switch mounted on the top surface of the tray 150. When the shelves move above the proximity switch, the proximity switch detects the shelves indicating that the shelves are placed in place, and at this time the limiting assembly 210 will start.

Figure 1:
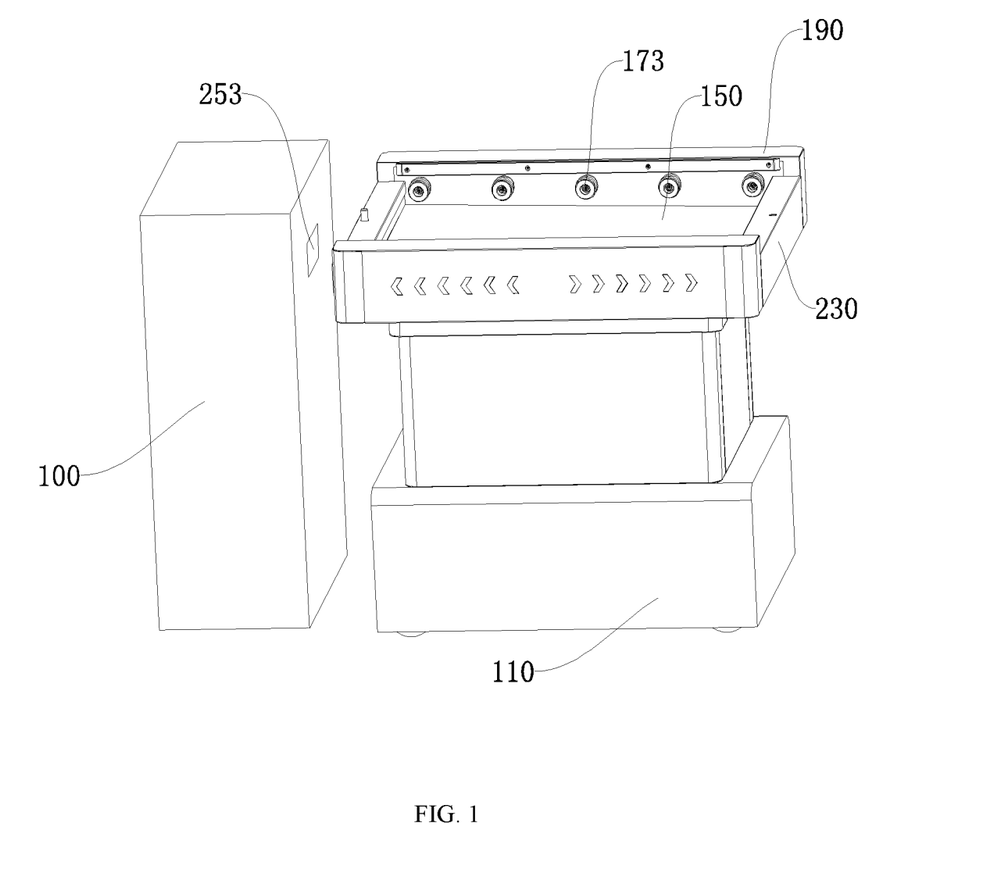
FIG. 1 schematically shows a structure of an automatic transport device for a cleaning machine according to one embodiment of the present disclosure.
Figure 2:
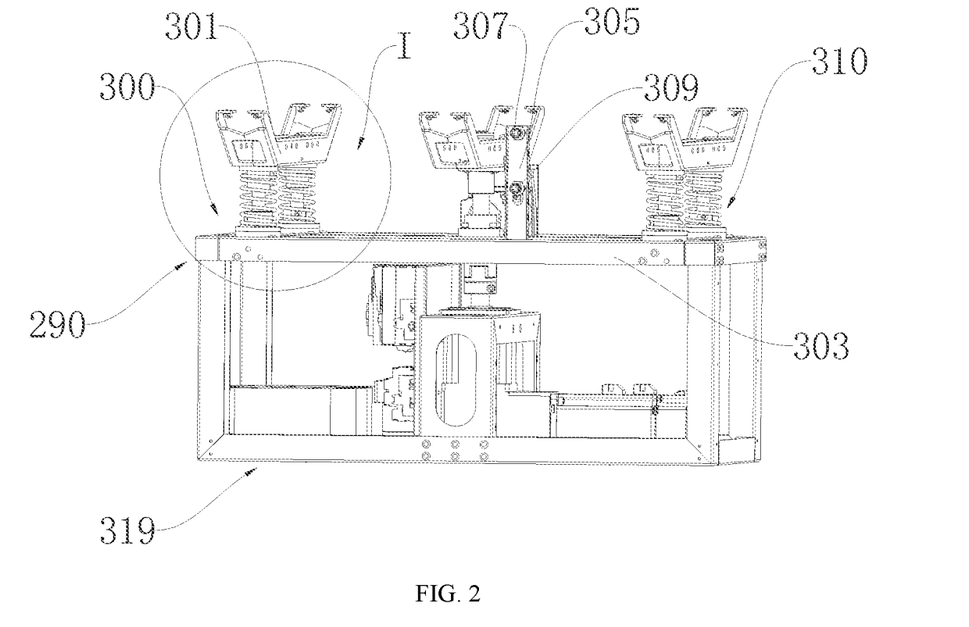
FIG. 2 is a structural diagram of a support assembly according to one embodiment of the present disclosure.
Figure 3:
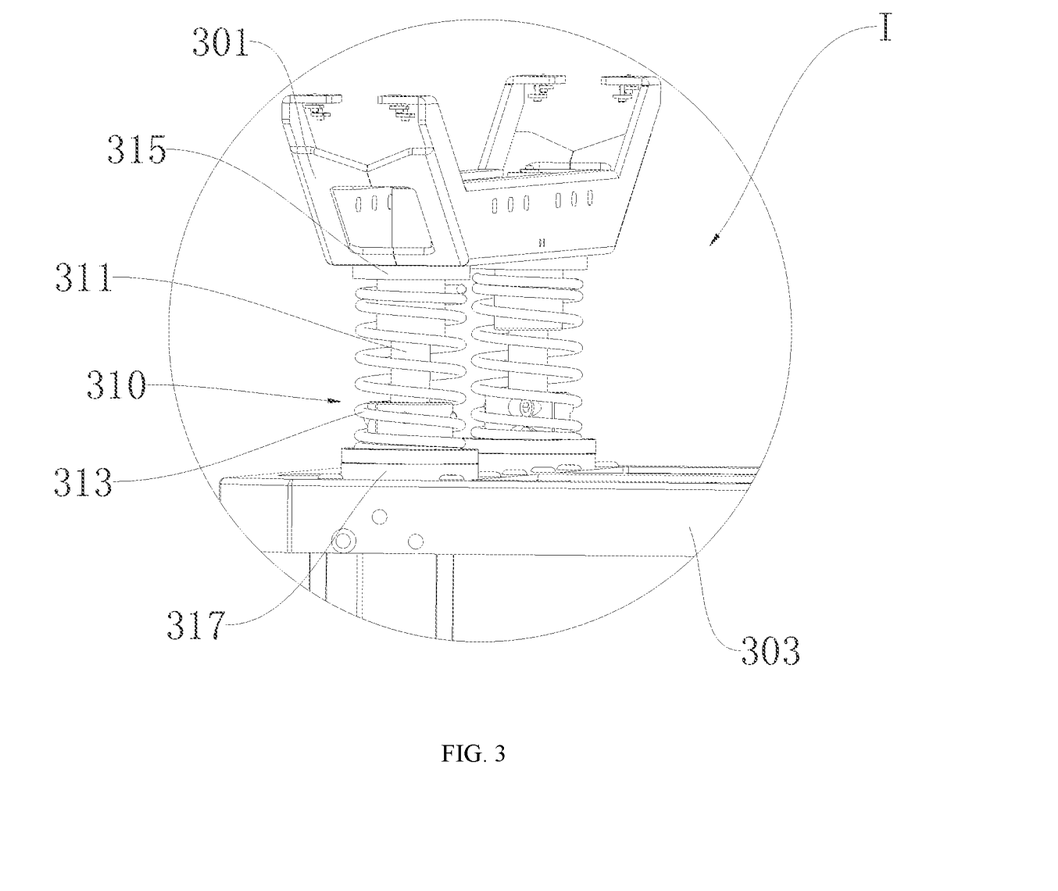
FIG. 3 is an enlarged view of portion "I" in FIG. 2.

Referring to FIGS. 2 and 3, a support assembly 290 is provided at the lower end of the tray 150. The support assembly 290 includes a first support frame 300 and a second support frame 319. The first support frame 300 includes a first transverse beam 301, a plurality of guide-support assemblies 310, and a second transverse beam 303. The first transverse beam 301 is connected to the second transverse beam 303 by the guide-support assemblies 310. The guide-support assemblies 310 have the function of smoothly guiding and providing a support force.

Further, the guide-support assembly 310 includes a guiding shaft 311. The guiding shaft 311 is sleevedly provided with a third spring 313 and a first limiting seat 315. A second limiting seat 317 is mounted at a lower end of the guiding shaft 311. The first limiting seat 315 and the second limiting seat 317 limit the third spring 313. The guiding shaft 311 is connected to the first transverse beam 301 through the first limiting seat 315. The guiding shaft 311 is connected to the second transverse beam 303 via the second limiting seat 317. The first transverse beam 301 is capable of reciprocating in the height direction of the guiding shaft 311.

When the tray 150 is subjected to a downward force, the first limiting seat 315 moves downwardly and together with the second limiting seat 317 compresses theh third spring 313, thereby cushioning the tray 150 when subjected to the force. The guiding shaft 311 is set vertically, allowing the tray 150 to move only upward and downward, and guiding the tray 150. Preferably, the guiding shaft 311 is a retractable hydraulic shaft.

In addition, a fixing plate 305 is provided on the second transverse beam 303. A first displacement detection device 307 and a second displacement detection device 309 are installed at intervals on the fixing plate 305. The first displacement detection device 307 is located above the second displacement detection device 309. The first displacement detection device 307 and the second displacement detection device 309 are used for detecting a displacement distance of the upper end of the lifting-lowering assembly 130. The maximum displacement distance of the lifting-lowering assembly 130 must not exceed the distance between the first displacement detection device 307 and the second displacement detection device 309. When the first displacement detection device 307 and the second displacement detection device 309 detect the upper end of the lifting-lowering assembly 130, the lifting-lowering assembly 130 stops moving or moves in the opposite direction.

Referring to FIG. 1 again, the support assembly 290 is provided with a housing on the outer periphery. The housing is used to protect the parts such as the lifting-lowering assembly 130 disposed within the housing, thereby avoiding damage to the parts and accumulation of dust caused by contact with liquids during use.

Further, the second transverse beam 303 is mounted above and abuts against the second support frame 319. The second support frame 319 is connected to the transport base 110. The first support frame 300 is connected to the transport base 110 via the lifting-lowering assembly 130. The lifting-lowering assembly 130 drives the tray 150 to move so that the first support frame 300 rises or falls in synchronization with the tray 150. When the tray 150 rises, the second transverse beam 303 separates from the second support frame 319.

Figure 4:
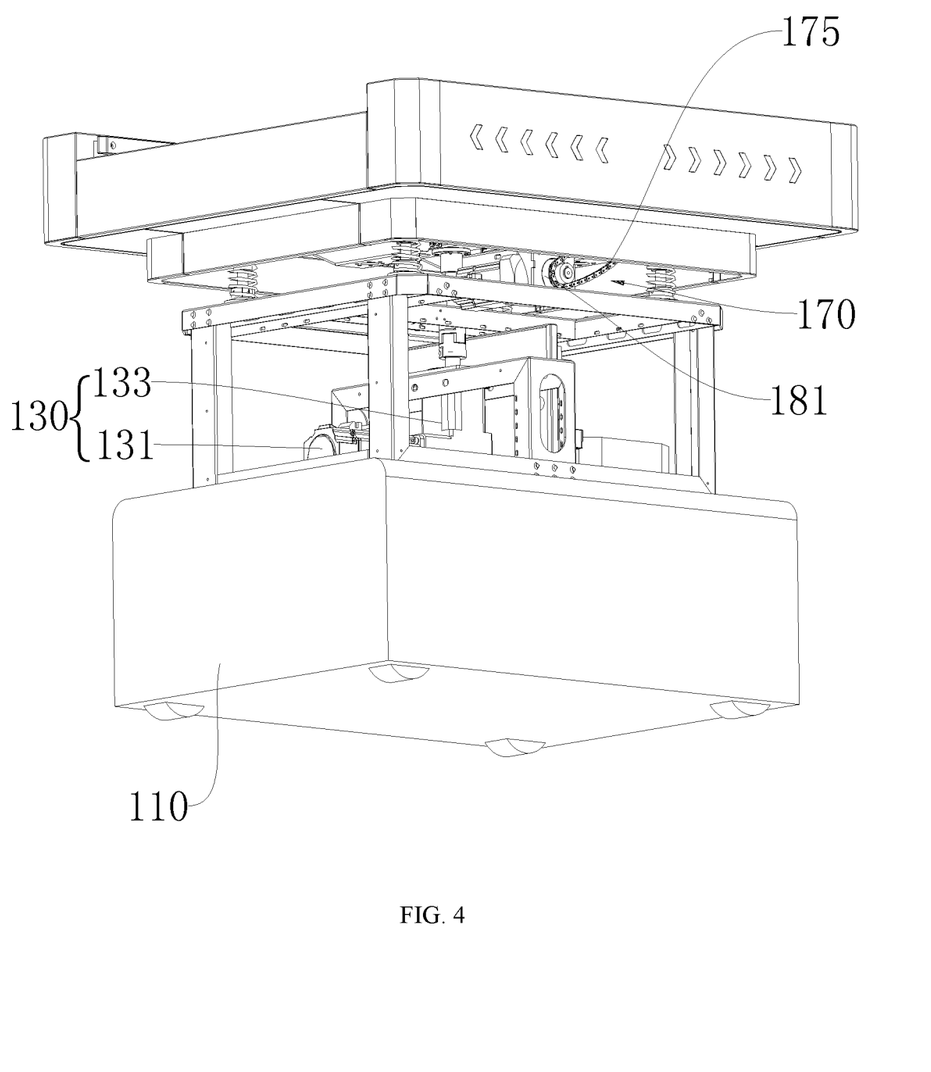
FIG. 4 is a structural diagram of the automatic transport device according to one embodiment of the present disclosure in the absence of a housing.

Referring to FIG. 4, the lifting-lowering assembly 130 includes a first driving device 131 and a deceleration device 133. The first driving device 131 is mounted on the top surface of the transport base 110. An output shaft of the first driving device 131 is connected to the deceleration device 133. An output shaft of the deceleration device 133 is connected to the first transverse beam 301. In this embodiment, the deceleration device 133 is a screw planetary reducer, which utilizes the principle of the screw to convert the rotational movement of the first driving device 131 into up-down movement of the output shaft of the deceleration device 133, thereby driving the tray 150 to move up and down. The speed of the output shaft of the deceleration device 133 is considerably slower than the rotational speed of the first driving device 131, which avoids rapid up-down movement of the tray 150, thus improving the accuracy of movement.

Figure 5:
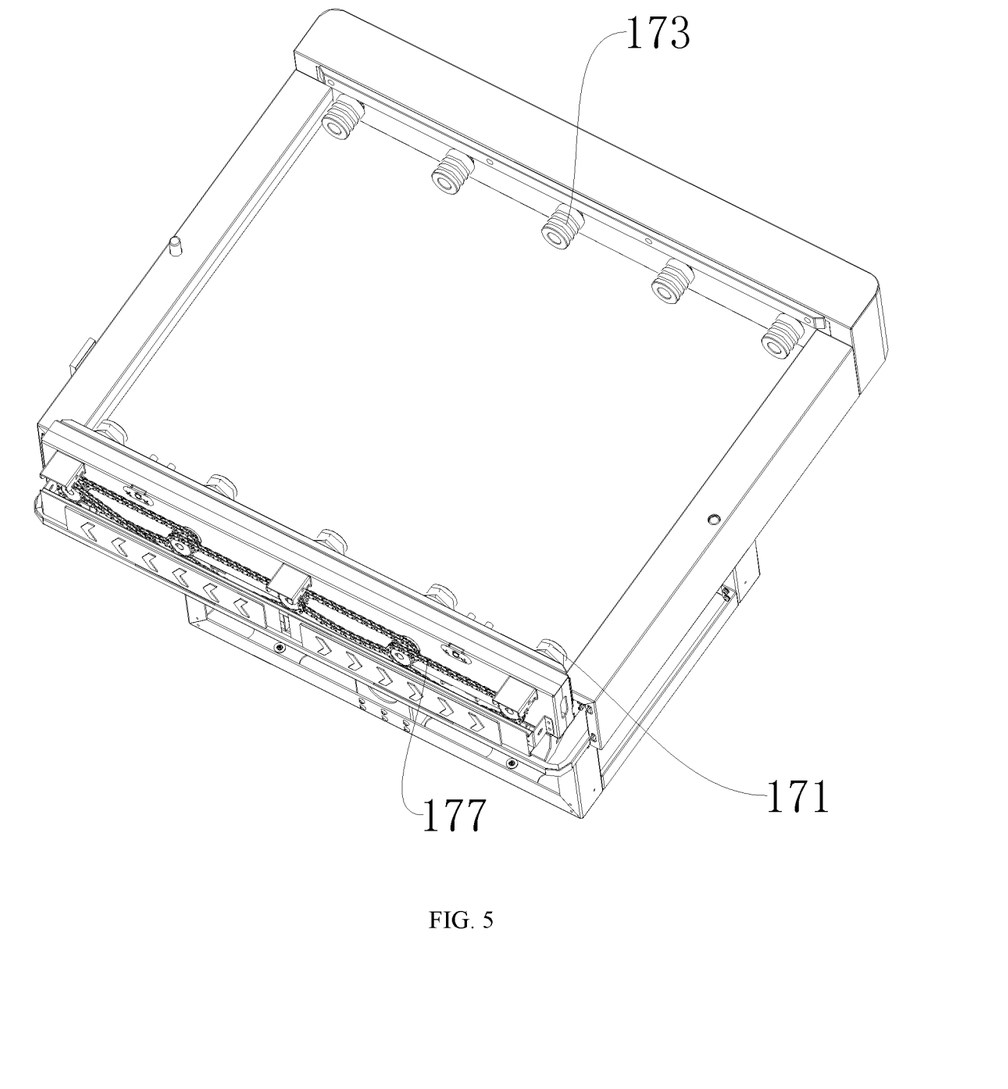
FIG. 5 is a structural diagram of a translation assembly mounted in a first mounting cavity according to one embodiment of the present disclosure.
Figure 10:
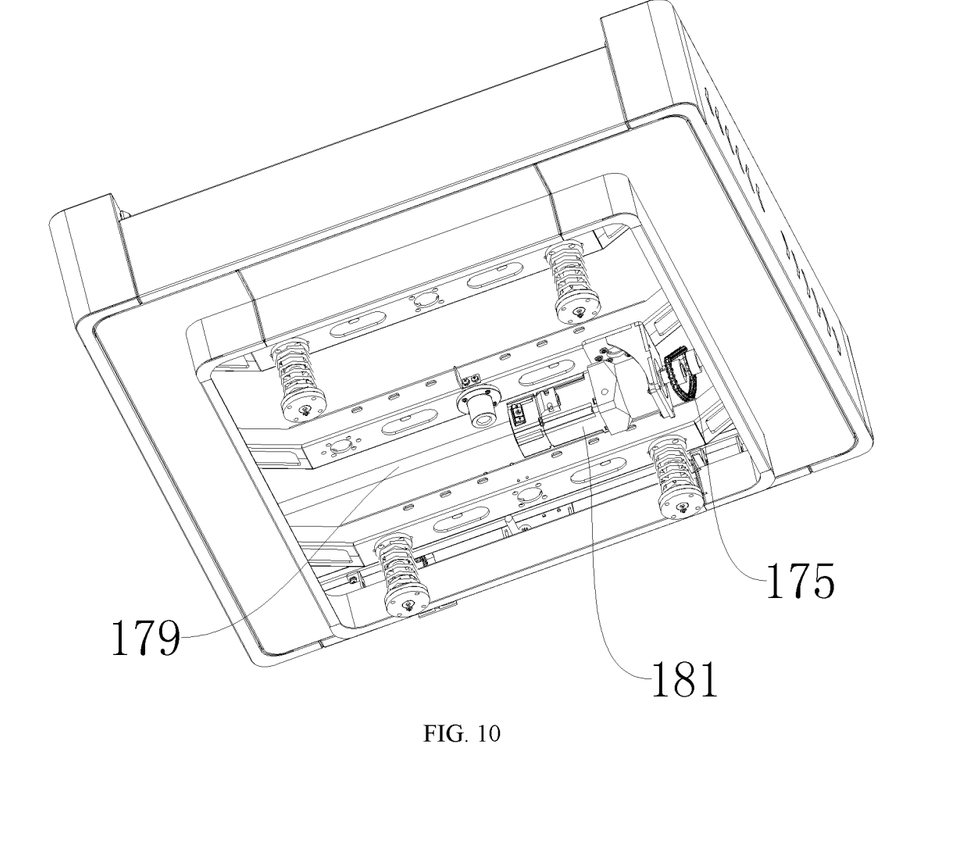
FIG. 10 is a structural diagram of a bottom of a tray according to one embodiment of the present disclosure.

Referring to FIGS. 5 and 10, the translation assembly 170 includes a plurality of first transfer rollers 171, a plurality of second transfer rollers 173, a first traction member 175, a plurality of second traction members 177, a transmission shaft 179, and a second driving device 181. An end of the first transfer roller 171 penetrates through and is connected with the side wall of one of the two first mounting cavities 190. An end of the second transfer roller 173 penetrates through and is connected with the side wall of the other of the two first mounting cavities 190. The first transfer roller 171 and the second transfer roller 173 should be arranged at the same horizontal height to ensure that the shelf is stably placed on the tray 150.

The transmission shaft 179 is mounted at the lower end of the tray 150 and is secured by two bearing seats. The output shaft of the second driving device 181 is connected to the transmission shaft 179 via the first traction member 175. An end of the transmission shaft 179 is connected to the first transfer roller 171 through the second traction member 177, and the other end of the transmission shaft 179 is connected to the second transfer roller 173 through the second traction member 177.

When the second driving device 181 drives the transmission shaft 179 to rotate, the first transfer roller 171 and the second transfer roller 173 connected to the transmission shaft 179 will also rotate synchronously. Through the second traction member 177, the plurality of first transfer rollers 171 are connected to each other, and the plurality of second transfer rollers 173 are connected to each other. Thus, the plurality of first transfer rollers 171 and the plurality of second transfer rollers 173 are indirectly connected to the transmission shaft 179, thereby realizing that all the first transfer rollers 171 and the second transfer rollers 173 are synchronously rotated. As a result, the shelves placed on the first transfer rollers 171 and the second transfer rollers 173 are moved in a certain direction. It is to be noted that, to ensure the effective work of the translation assembly 170, the first traction member 175 and the second traction member 177 are transmission chains. The output shaft of the second driving device 181, the ends and the middle of the transmission shaft 179, and the first transfer roller 171 and the second transfer roller 173 are mounted with gears, which cooperate with the transmission chains, to avoid the translation assembly 170 from doing ineffective work. Preferably, the first transfer roller 171 and second transfer roller 173 are set uniformly on the inner sidewall of the first mounting cavity 190. The first traction member 175, second traction member 177, and gears are set inside the first mounting cavity 190 to protect the transmission components from corrosion.

Figure 6:
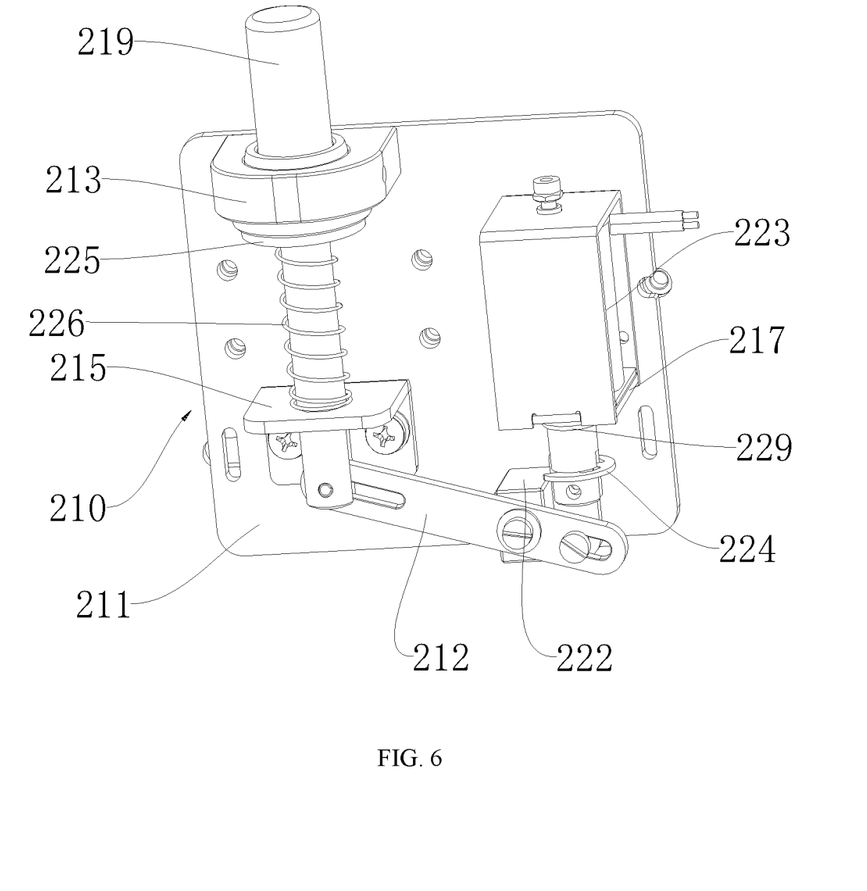
FIG. 6 is a structural diagram of a limiting assembly according to one embodiment of the present disclosure.

Referring to FIG. 6, the limiting assembly 210 includes a mounting plate 211. A first fixing base 213, a second fixing base 215, a third fixing base 217, a stopper rod 219, a linkage rod 212, and an electromagnet device 223 are mounted on the mounting plate 211. The stopper rod 219 passes sequentially from top to bottom through the top surface of the second mounting cavity 230, the first fixing base 213, and the second fixing base 215. The stopper rod 219 is sleevedly provided with a first limiting ring 225. The first limiting ring 225 is located between the first fixing base 213 and the second fixing base 215. The stopper rod 219 is sleevedly provided with a first spring 226. The first spring 226 is located between the second fixing base 215 and the first limiting ring 225. The tension of the first spring 226 causes the upper end of the stopper rod 219 to remain extended out of the top surface of the second mounting cavity 230 when there is no other force, at which time the upper end of the stopper rod 219 will press against the shelf, thereby restricting displacement of the shelf.

The lower end of the stopper rod 219 is connected to the electromagnetic device 223 through the linkage rod 212. The linkage rod 212 is provided with a fixing member 222. The linkage rod 212 is rotationally connected to the mounting plate 211 through the fixing member 222. The linkage rod 212 is capable of rotating at a certain angle with the fixing member 222 as the center. The electromagnetic device 223 is mounted on the third fixing base 217. The lower end of the electromagnetic device 223 passes through the third fixing base 217. The lower end of the electromagnetic device 223 is sleevedly provided with a second spring 229 and a second limiting ring 224. The third fixing base 217 and the second limiting ring 224 limit the second spring 229.

Utilizing the principle of leverage, when the electromagnetic device 223 is energized, the lower end of the electromagnetic device 223 moves upwardly to drive the right side of the linkage rod 212 upwardly. Meanwhile, the left end of the linkage rod 212 moves downwardly to drive the stopper rod 219 downwardly until the top surface of the stopper rod 219 is equal to or lower than the height of the top surface of the second mounting cavity. The shelf is not limited by the stopper rod 219 and can be moved. Meanwhile, the second limiting ring 224 moves upwardly and together with the third fixing base 217 squeezes the second spring 229, and the second spring 229 is in an energy storage state. Similarly, the first limiting ring 225 and the second fixing base 215 together squeeze the first spring 226, and the first spring 226 is in an energy storage state. When the electromagnetic device 223 is de-energized, the lower end of the electromagnetic device 223 moves downwardly under the tension of the second spring 229, and the first limiting ring 225 moves upwardly under the tension of the first spring 226. Meanwhile, the upper end of the stopper rod 219 extends, and the shelf is newly limited. The stopper rod 219 is connected to the mounting plate 211 through the first fixing base 213 and the second fixing base 215, which can withstand a certain radial impact and axial impact, occupy a small height space, low cost, and is easy to control.

The electromagnetic device 223 is an electromagnetic telescopic rod. The electromagnetic telescopic rod includes a coil and a magnetic push-pull rod extending into the coil. When the coil is energized, it generates a magnetism that attracts to the magnetic push-pull rod, to cause the magnetic push-pull rod to be displaced. In this embodiment, the lower end of the electromagnetic device 223 is equipped with the magnetic push-pull rod. The second spring 229 and the second limiting ring 224 are set on the magnetic push-pull rod. When the coil is de-energized, the tension of the second spring 229 pushes the second limiting ring 224, so as to reset the magnetic push-pull rod.

Figure 7:
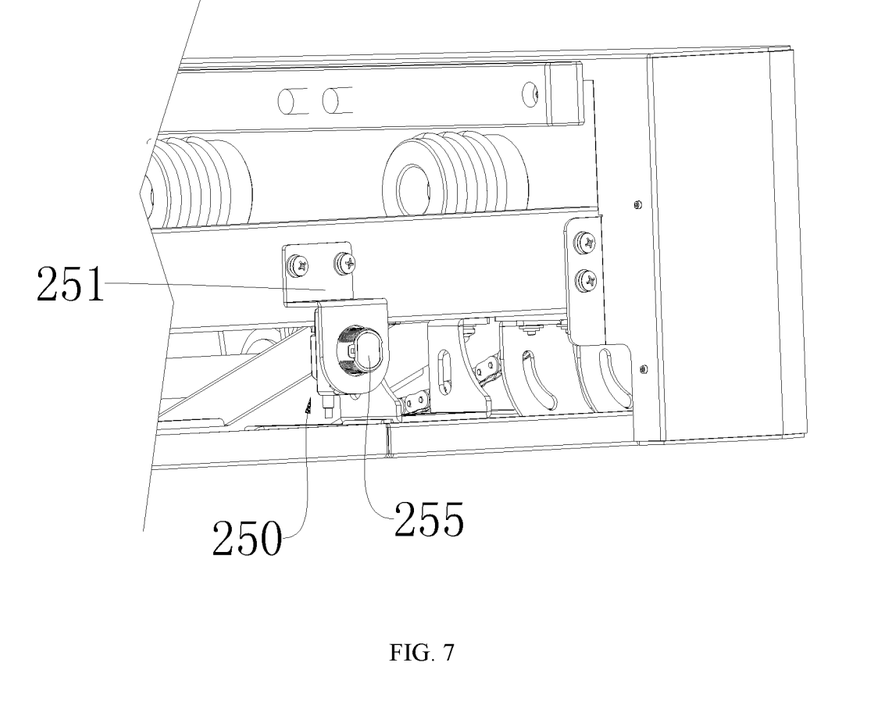
FIG. 7 is a schematic diagram of a lifting-lowering sensing assembly mounted in a second mounting cavity according to one embodiment of the present disclosure.

Referring to FIG. 7, the lifting-lowering sensing assembly 250 includes a first mounting base 251 and a reflective plate 253. The first mounting base 251 is mounted on a side wall of the tray 150. The first mounting base 251 is provided with a photoelectric sensing device 255. The reflective plate 253 is mounted on the transport platform 100. A first avoidance hole 231 is provided on a side wall of the second mounting cavity 230 and is opposite to the photoelectric sensing device 255. During the lifting and lowering of the tray 150, the photoelectric sensing device 255 emits light through the first avoidance hole 231 to the transport platform 100, and the incidence position of the light changes with the movement of the tray 150. When the light is emitted on the reflective plate 253, the reflective plate 253 reflects the light in the original way to the photoelectric sensing device 255. When the photoelectric sensing device 255 receives the reflected light, the lifting-lowering assembly 130 stops work, at this moment the height of the tray is the same as the height of the transport platform 100.

Figure 8:
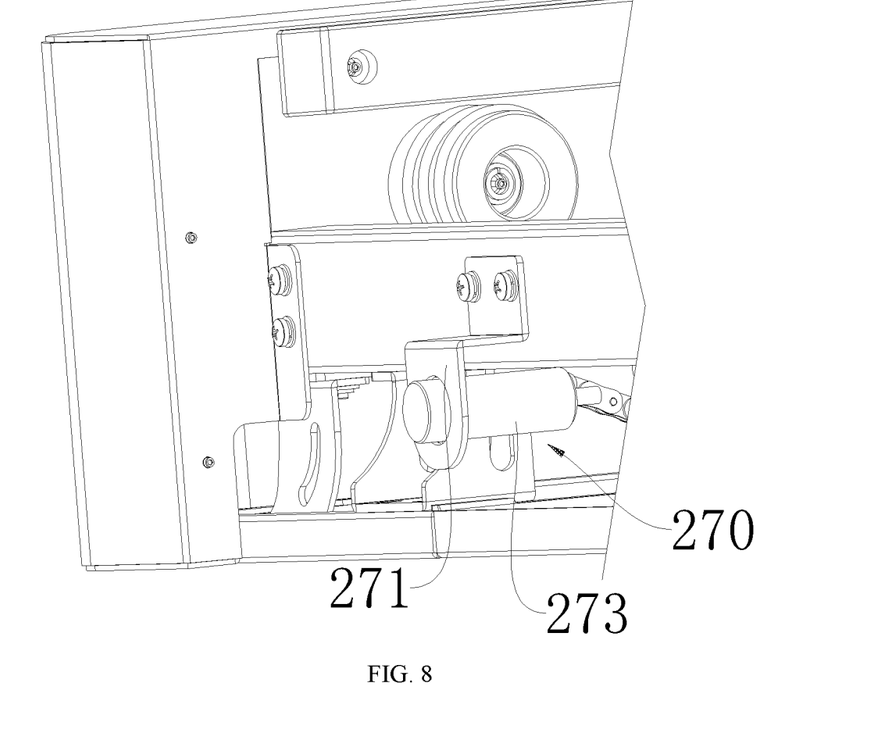
FIG. 8 is a schematic diagram of a distance sensing assembly mounted in a second mounting cavity according to one embodiment of the present disclosure.

Referring to FIG. 8, the distance sensing assembly 270 includes a second mounting base 271. The distance sensing device 273 is mounted on the second mounting base 271. A second avoidance hole 233 is provided on a side wall of the second mounting cavity 230. The distance sensing device 273 can detect a distance between the transport platform 100 and the distance sensing device 273 through the second avoidance hole 233. After the distance sensing device 273 detects the distance between the transporter and the transport platform, the transport device moves slowly towards the transport platform 100. When the distance sensing device 273 detects that the distance is 0 or close to 0, the transport device stops moving, at which time precise docking is achieved between the transport device and the transport platform, transferring the shelf from the transport device to the transport platform 100.

Further, the first avoidance hole 231 and the second avoidance hole 233 are both mounted with adapted acrylic plates. The acrylic plates can place liquids and dust into the second mounting cavity 230, and at the same time can realize the induction function.

Figure 9:
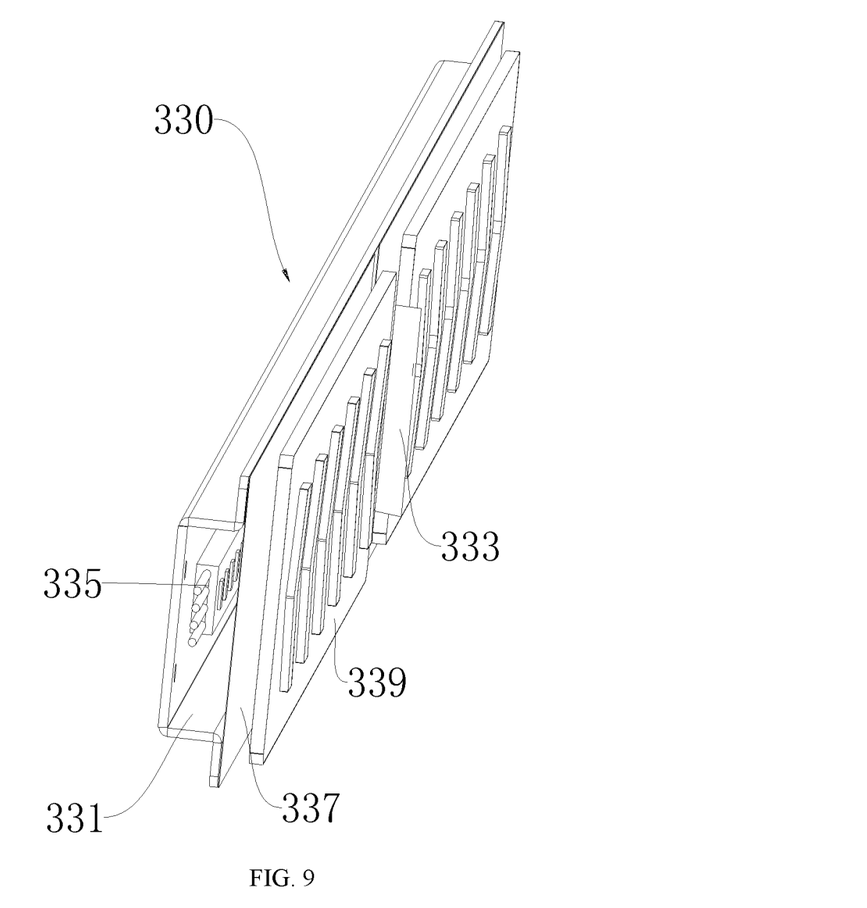
FIG. 9 is a structural diagram of a guiding assembly according to one embodiment of the present disclosure.

Referring to FIG. 9, the first mounting cavity 190 is also provided with a guiding assembly 330. The guiding assembly 330 includes a light slot 331. A light barrier 333 is provided in the light slot 331. A light strip 335 is provided on each of two sides of the light barrier 333. The light strip 335 is connected to the surface of the light slot 331. A diffusion film 337 and a diffusion plate 339 are mounted on the side wall of the light slot 331. The diffusion film 337 is located between the light strip 335 and the diffusion plate 339. The diffusion plate 339 is provided with a direction marking on the outer side thereof. The side wall of the first mounting cavity 190 is provided with a guide hole having the same shape as the direction marking, so that the light emitted from the light strip can be diffused out from the guide hole. By adding at least one layer of diffusion film to diffuse the light emitted from the light strip 335 over a smaller distance to a larger range and into a uniform brightness, the application scenario of light-emitting letters or light-emitting signs in a small space can be satisfied, avoiding the use of the larger-thickness diffusion plate and low cost.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. An automatic transport device for conveying a shelf to a transport platform of a cleaning machine, comprising:
   a transport base;
   a lifting-lowering assembly;
   a tray; and
   a translation assembly;
   wherein the lifting-lowering assembly and the tray are provided on a top of the transport base; the tray is connected to the transport base through the lifting-lowering assembly; and the lifting-lowering assembly is configured to drive the tray to reciprocate in a height direction of the tray;
   a top surface of the tray is provided with the translation assembly; and the translation assembly is configured to receive and transfer the shelf to the transport platform;
   a first end of the tray and a second end of the tray opposite to the first end of the tray are each provided with a first mounting cavity; and the translation assembly is connected to a side wall of the first mounting cavity;
   a third end of the tray and a fourth end of the tray opposite to the third end of the tray are each provided with a second mounting cavity; the second mounting cavity is provided with a limiting assembly, a lifting-lowering sensing assembly, and a distance sensing assembly; the lifting-lowering sensing assembly is configured to position a height of the transport platform; the distance sensing assembly is configured to measure a distance between the transport device and the transport platform; and the limiting assembly is configured to limit a position of the shelf,
   an interactive system is provided in the transport base; and the lifting-lowering assembly, the translation assembly, the lifting-lowering sensing assembly, the limiting assembly, and the distance sensing assembly are electrically connected to the interactive system;
   the limiting assembly comprises a mounting plate; and a first fixing base, a second fixing base, a third fixing base, a stopper rod, a linkage rod, and an electromagnetic device are provided on the mounting plate;
   the stopper rod passes sequentially through a top surface of the second mounting cavity, the first fixing base and the second fixing base; the stopper rod is provided with a first limiting ring; the first limiting ring is located between the first fixing base and the second fixing base;

and the stopper rod is sleevedly provided with a first spring, and the first spring is located between the second fixing base and the first limiting ring;

a lower end of the stopper rod is connected to the electromagnetic device through the linkage rod; the linkage rod is provided with a fixing member; and the linkage rod is connected to the mounting plate through the fixing member;

the electromagnetic device is mounted on the third fixing base; a lower end of the electromagnetic device passes through the third fixing base; the lower end of the electromagnetic device is sleevedly provided with a second spring and a second limiting ring; and the third fixing base and the second limiting ring are configured to limit the second spring; and the lower end of the electromagnetic device is configured to reciprocate along a height direction of the electromagnetic device, so as to drive the stopper rod to reciprocate in a height direction of the stopper rod.

2. The automatic transport device of claim 1, wherein a support assembly is provided at a lower end of the tray; the support assembly comprises a first support frame and a second support frame; the first support frame is connected to the lower end of the tray; the second support frame is connected to the transport base; the first support frame is located above the second support frame and abuts against the second support frame; and the first support frame is connected to the transport base through the lifting-lowering assembly.

3. The automatic transport device of claim 2, wherein the first support frame comprises a first transverse beam, a plurality of guide-support assemblies and a second transverse beam; each of the plurality of guide-support assemblies comprises a guiding shaft; the guiding shaft is sleevedly provided with a third spring and a first limiting seat; a lower end of the guiding shaft is provided with a second limiting seat; the first limiting seat and the second limiting seat are configured to limit the third spring; the guiding shaft is connected to the first transverse beam through the first limiting seat; the guiding shaft is connected to the second transverse beam through the second limiting seat; and the first transverse beam is configured to reciprocate in a height direction of the guiding shaft.

4. The automatic transport device of claim 1, wherein the lifting-lowering assembly comprises a driving device and a deceleration device; the driving device is mounted on the transport base; an output shaft of the driving device is connected to the deceleration device; and an output shaft of the deceleration device is connected to a lower end of the tray.

5. The automatic transport device of claim 1, wherein the translation assembly comprises a plurality of first transfer rollers, a plurality of second transfer rollers, a first traction member, a plurality of second traction members, a transmission shaft, and a driving device;

an end of each of the plurality of first transfer rollers penetrates through and is connected with a side wall of one of two first mounting cavities; and an end of each of the plurality of second transfer rollers penetrates through and is connected with a side wall of the other of the two first mounting cavities;

the transmission shaft is mounted at a lower end of the tray; and an output shaft of the driving device is connected to the transmission shaft via the first traction member; and an end of the transmission shaft is connected to the plurality of first transfer rollers via the second traction member; and the other end of the transmission shaft is connected to the plurality of second transfer rollers via the second traction member.

6. The automatic transport device of claim 1, wherein when the stopper rod is moved downwardly into place, a height of a top surface of the stopper rod is equal to or lower than a height of a top surface of the second mounting cavity.

7. The automatic transport device of claim 1, wherein the lifting-lowering sensing assembly comprises a mounting base and a reflective plate; the mounting base is mounted on a side wall of the tray; the mounting base is provided with a photoelectric sensing device; and the reflective plate is mounted on the transport platform; and an avoidance hole is provided on a side wall of the second mounting cavity and is opposite to the photoelectric sensing device.

8. The automatic transport device of claim 1, wherein the distance sensing assembly comprises a mounting base; a distance sensing device is mounted on the mounting base; an avoidance hole is provided on a side wall of the second mounting cavity; and the distance sensing device is configured to detect a distance between the transport platform and the distance sensing device through the avoidance hole.

9. The automatic transport device of claim 1, wherein the first mounting cavity is further provided with a guiding assembly; the guiding assembly comprises a light slot; a light barrier is provided in the light slot; a light strip is provided on each of two sides of the light barrier; the light strip is connected to a surface of the light slot; a diffusion film and a diffusion plate are provided on a side wall of the light slot; and the diffusion film is located between the light strip and the diffusion plate.

* * * * *